United States Patent
Chaubey et al.

(10) Patent No.: US 8,163,809 B2
(45) Date of Patent: *Apr. 24, 2012

(54) PROCESS FOR DECREASING OR ELIMINATING UNWANTED HYDROCARBON AND OXYGENATE PRODUCTS CAUSED BY FISHER TROPSCH SYNTHESIS REACTIONS IN A SYNGAS TREATMENT UNIT

(75) Inventors: Trapti Chaubey, Wilmington, DE (US); Yudong Chen, Garnet Valley, PA (US); Robert Gagliano, Cochranville, PA (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 153 days.

This patent is subject to a terminal disclaimer.

(21) Appl. No.: 12/627,601

(22) Filed: Nov. 30, 2009

(65) Prior Publication Data

US 2011/0127469 A1    Jun. 2, 2011

(51) Int. Cl.
*C07C 27/00* (2006.01)
*C07C 1/02* (2006.01)

(52) U.S. Cl. ......... 518/728; 518/700; 518/715; 252/373

(58) Field of Classification Search .................. 518/700, 518/715, 728; 252/373
See application file for complete search history.

(56) References Cited

U.S. PATENT DOCUMENTS

| | | | |
|---|---|---|---|
| 4,732,596 | A | 3/1988 | Nicholas et al. |
| 5,897,686 | A | 4/1999 | Golden et al. |
| 6,444,326 | B1 | 9/2002 | Smith |
| 6,511,760 | B1 | 1/2003 | Barone et al. |
| 7,070,833 | B2 | 7/2006 | Smith et al. |
| 7,476,246 | B2 | 1/2009 | Pathak |
| 2004/0180975 | A1 | 9/2004 | Pan et al. |
| 2005/0000354 | A1 | 1/2005 | Monereau |
| 2005/0118089 | A1 | 6/2005 | Abbott et al. |
| 2005/0165121 | A1 | 7/2005 | Wang et al. |
| 2006/0117952 | A1 | 6/2006 | Bancon et al. |
| 2007/0051238 | A1 | 3/2007 | Jain et al. |
| 2008/0020216 | A1 | 1/2008 | Bagnoli et al. |
| 2008/0244975 | A1 | 10/2008 | Johnston |
| 2008/0249196 | A1 | 10/2008 | Wentink |
| 2008/0287581 | A1 | 11/2008 | Kim et al. |
| 2009/0294103 | A1 | 12/2009 | Van Dongen et al. |
| 2010/0024641 | A1 | 2/2010 | Monereau et al. |
| 2011/0126705 | A1 | 6/2011 | Chaubey et al. |

FOREIGN PATENT DOCUMENTS

| | | |
|---|---|---|
| EP | 0903424 | 3/1999 |
| EP | 1724542 | 11/2006 |
| FR | 2911289 | 7/2008 |
| WO | 2010066972 | 6/2010 |

OTHER PUBLICATIONS

PCT ISR and Written Opinion for PCT/US2010/057722, 2010.
Dry, M.E., "Chemical Concepts Used for Engineering Purposes", Chapter 3, In: A.P. Steinberg, M.E. Dry: "Fischer Tropsch Technology" Jan. 1, 2004, Elsevier, Amsterdam, XP002628822, ISN: 044451354X, vol. 152, pp. 196-257.
Zinc Information Center, "Application of Zinc Coatings for Iron and Steel", Copyright 2003, http://www.zincinfocentre.org/zinc applications, html, Dec. 14, 2009.
Van Der Lann, Gerard P., "Kinetics and Selectivity of the Fischer-Tropsch Synthesis: A Literature Review", Catal. Rev., Sci. Eng., 41 (3&4). 1999, pp. 255-318.
PCT ISR and Written Opinion for PCT/US2010/057716, 2010.
PCT ISR and Written Opinion for PCT/US2011/025250, 2011.
U.S. Appl. No. 12/709,909.

*Primary Examiner* — Jafar Parsa
(74) *Attorney, Agent, or Firm* — Elwood L. Haynes

(57) ABSTRACT

The present invention provides a process for decreasing or eliminating unwanted hydrocarbon and oxygenate products caused by FTS reactions in a syngas treatment unit by utilizing heat exchangers and optionally associated pipes that are substantially fabricated of a material selected from the group consisting of chromium containing alloys and carbon steel for heating up gas streams having a carbon monoxide partial pressure of less than or equal to one bar and obtained from a front end purification unit/cold box unit.

25 Claims, 1 Drawing Sheet

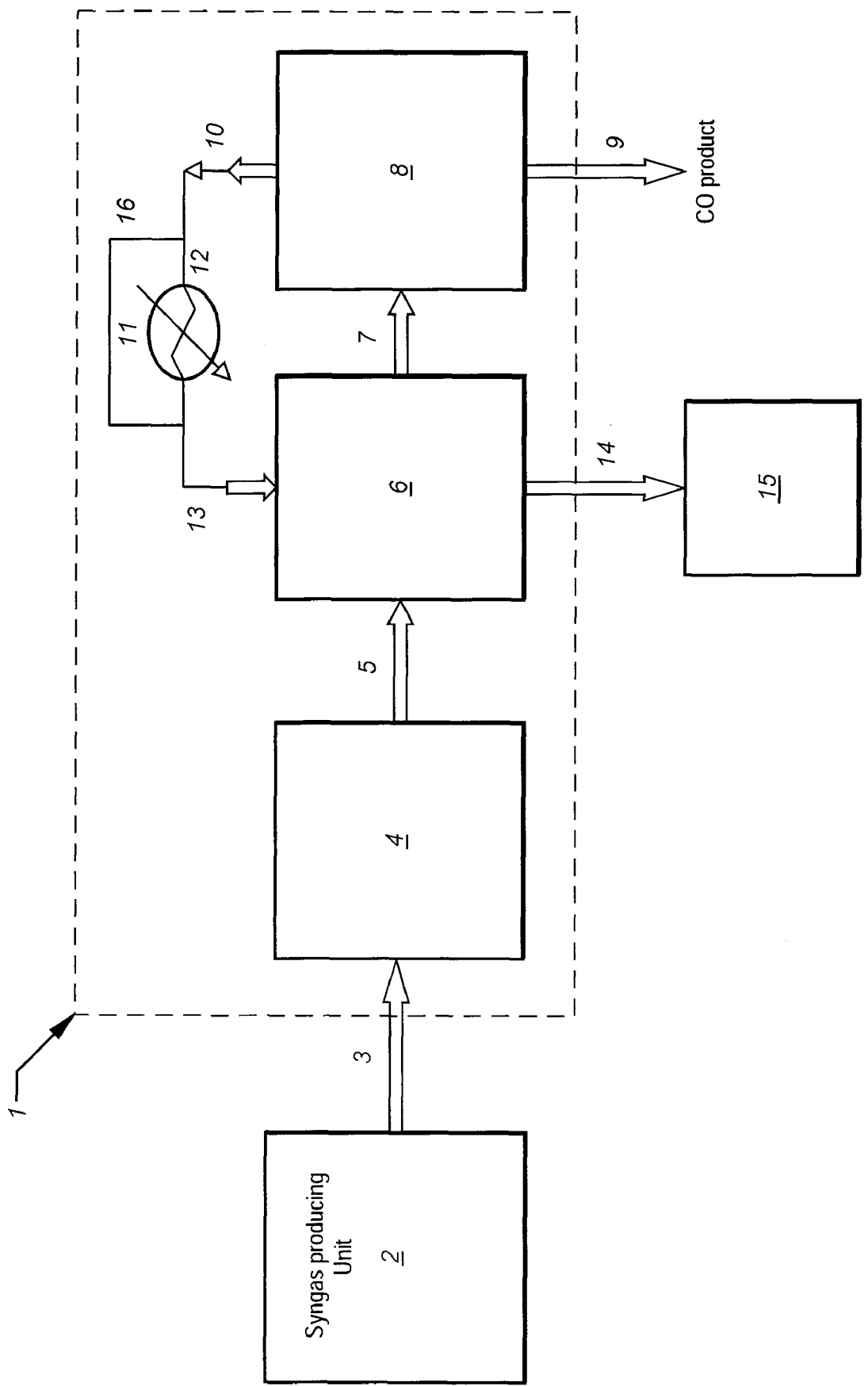

PROCESS FOR DECREASING OR ELIMINATING UNWANTED HYDROCARBON AND OXYGENATE PRODUCTS CAUSED BY FISHER TROPSCH SYNTHESIS REACTIONS IN A SYNGAS TREATMENT UNIT

FIELD OF THE INVENTION

The present invention relates to a process for decreasing or eliminating unwanted hydrocarbon and oxygenate products caused by Fischer Tropsch Synthesis reactions in a syngas treatment unit.

BACKGROUND

Chemical plants involve many processes and unit operations including reactions, heat recovery, purification or separation, etc. These processes can be operated at high temperatures and pressures. Syngas contains a mixture of hydrogen and carbon monoxide in various proportions as well as a variety of impurities. The syngas is produced by a number of different processes, including coal gasification, steam methane reforming, autothermal reforming or partial oxidation, etc. Syngas can be highly reactive at certain conditions thereby in certain circumstances leading to unwanted reactions which form impurities. For example, syngas is known to react at high temperature and pressure on metals surface to produce unwanted hydrocarbon and oxygenate products along with water and carbon dioxide, etc. These unwanted hydrocarbon and oxygenate products can ultimately lead to wax formation which can plug the system, contaminate downstream processes, and/or create hazardous conditions in some cases. The material of fabrication for the vessels used in plants can sometimes demonstrate catalytic activity with syngas producing unwanted products or impurities. Hydrogen and carbon monoxide adsorb then dissociate on the active surface and react to form chain initiator ($CH_3$), methylene ($CH_2$) monomer and water. These hydrocarbons are formed by $CH_2$ insertion into metal-alkyl bonds and subsequent dehydrogenation or hydrogenation to an olefin or paraffin respectively. Carbon monoxide adsorbs associatively to produce alcohols. These unwanted reactions are mainly caused by Fischer Tropsch Synthesis (hereinafter "FTS"). FTS is a well-known process that is typically used to produce synthetic fuels (i.e., diesel, petrol, kerosene, etc) from syngas. Fischer Tropsch synthesis is a surface polymerization reaction producing a multi-component mixture of linear and branched hydrocarbons ultimately leading to wax formation. Water gas shift reaction can produce carbon dioxide and hydrogen from carbon monoxide and water. The FTS reactions include:

| Main reactions | |
|---|---|
| Paraffins | $(2n+1)H_2 + nCO \rightarrow C_nH_{2n+2} + nH_2O$ |
| Olefins | $2nH_2 + nCO \rightarrow C_nH_{2n} + nH_2O$ |
| WGS reaction | $CO + H_2O \Longleftrightarrow CO_2 + H_2$ |
| Side reactions | |
| Alcohols | $2nH_2 + nCO \rightarrow C_nH_{2n+2}O + (n-1)H_2O$ |
| Catalyst oxidation/reduction | (a) $M_xO_y + yH_2 \Longleftrightarrow yH_2O + xM$ |
| | (b) $M_xO_y + yCO \Longleftrightarrow yCO_2 + xM$ |
| Bulk carbide formation | $yC + xM \Longleftrightarrow M_xC_y$ |
| Boudouard reaction | $2CO \rightarrow C + CO_2$ |

The result of FTS reactions in unwanted circumstances is the contamination of the downstream processes, and plugging in the lines leading to pressure build up and hazardous conditions.

Much effort has been spent on improving the catalyst performance for FTS process but little information is available on how to reduce unwanted FTS reactions. Accordingly, there is a need to provide a process for decreasing or eliminating FTS reactions in certain situations in order to minimize problems such as contamination, plugging and/or the creation of hazardous conditions.

SUMMARY OF THE INVENTION

The present invention provides a process for decreasing or eliminating unwanted hydrocarbon and oxygenate products caused by FTS reactions in a syngas treatment unit by utilizing heat exchangers and optionally associated pipes that are substantially fabricated of a material selected from the group consisting of chromium containing alloys and carbon steel for heating up gas streams having a carbon monoxide partial pressure of less than or equal to one bar and obtained from a front end purification unit/cold box unit.

BRIEF DESCRIPTION OF THE FIGURE

FIG. 1 provides an overview of the equipment and flow scheme utilized in the process of the present invention.

DETAILED DESCRIPTION OF THE INVENTION

As noted above, FTS in syngas plants can often lead to the production of unwanted hydrocarbon and oxygenate products which form a waxy build up on the equipment being utilized. These unwanted hydrocarbon and oxygenate products result when the conditions within the syngas treatment unit are optimum for FTS reactions. These reactions typically take place in situations where gas streams containing hydrogen and carbon monoxide along with other possible impurities are subjected to high temperature and high pressure in the presence of active metals such as iron, nickel, cobalt, ruthenium, platinum and palladium. For example, such reactions can take place with regard to gas streams produced from a front end purification unit/cold box unit which are then subjected to heat exchange in order to allow the gas stream to be recycled for further use in the front end purification unit. More specifically, when a gas stream produced by treatment in a front end purification unit is followed by condensation in a cold box and then heated to a temperature from about 100° C. to about 275° C. at a pressure of about 10 bar to about 60 bar in a heat exchanger that is fabricated from iron, nickel, cobalt, ruthenium, platinum and/or palladium, unwanted hydrocarbon and oxygenate products typically form as a result of FTS reactions. Accordingly, the present invention provides a process which decreases or eliminates these unwanted hydrocarbon and oxygenate products that are caused by FTS reactions in the syngas treatment unit.

In the process of the present invention, it is possible to further process syngas streams obtained in any variety of manners including, but not limited to, by coal gasification, by steam hydrocarbon reforming, by autothermal reforming or by partial oxidation. Accordingly, such syngas streams may be obtained in whole or in part from the treatment of hydrocarbon feedstock such as crude oil, coal or natural gas in a coal gasification unit, a steam hydrocarbon reforming unit, an autothermal reforming unit or a partial oxidation unit. The syngas stream to be treated will typically contain hydrogen and carbon monoxide as well as a variety of impurities such as, methane, carbon dioxide, sulfur containing species, water, $NO_x$, unsaturated hydrocarbons, etc depending upon the original hydrocarbon feed utilized to produce the syngas stream.

The process of the present invention is utilized in a syngas treatment unit that comprises, at a minimum, (1) an impurities removal unit selected from an adsorption removal unit and an absorption removal unit; (2) a front end purification unit containing two or more beds of adsorbents that are selective for the removal of certain impurities, the front end purification unit operating on a cycle per adsorbent bed that includes at least an adsorption step and a regeneration step; (3) a cold box allowing for the condensation of carbon monoxide at a temperature range from about −150° C. to about −250° C.; (4) one or more heat exchangers operating at a temperature from about 100° C. to 275° C. and capable of being operated in a constant flow mode or a standby mode; (5) pipes that connect the one or more heat exchangers and the front end purification unit; and (6) a bypass pipe which allows for the transfer of a gas stream for cooling from the cold box either directly to the front end purification unit (bypassing the one or more heat exchangers) to be used in the regeneration step or optionally for further use elsewhere in the same unit or another unit.

The impurities removal unit utilized in the present invention can be any removal unit which is capable of removing impurities from a syngas stream. Preferably, the impurities removal unit is selected from an adsorption removal unit and an absorption removal unit. As used herein the phrase "absorption removal unit" refers to a unit that uses a liquid phase to assist in the removal of targeted impurities. The absorption removal unit can be a physical solvent removal unit such as a MDEA unit, an amine wash unit or a rectisol unit or a chemical solvent removal unit such as a unit in which zinc compounds are used for the removal of sulfur species from the gas stream. The phrase "adsorption removal unit" as used herein refers to a unit that utilizes a pressure swing adsorption unit or a thermal swing adsorption unit for the removal of impurities. Those of ordinary skill in the art will recognize that these various impurities removal units and the parameters at which the process within each may be carried out are well known in the art. Accordingly, the examples set forth herein are not meant to be limiting with regard to the present invention.

With regard to the present invention, the front end purification unit can be any front end purification unit that is known in the art that comprises two or more adsorbent beds, each adsorbent bed containing one or more adsorbents. While not wishing to be limiting, typically the one or more adsorbents utilized in the front end purification unit are selected from alumina, zeolites, silica gels and mixtures thereof. The arrangement of the adsorbents in the adsorbent beds may be in any manner that is known in the art, including, but not limited to, in a single layer, in multiple layers or as layers in a radial bed. In the most preferred embodiments of the present invention, the one or more adsorbents utilized in the front end purification unit are independently selected from zeolites in the form of molecular sieves selected from A type, Y type and X type molecular sieves. In alternative preferred embodiments of the present invention, more than one bed of adsorbent is utilized in the front end purification unit with each bed in the front end purification unit independently comprising one or more adsorbents. When more than one adsorbent is present in a particular adsorbent bed, the adsorbents within that particular adsorbent bed will preferably be present in layers.

The front end purification unit must also be of the type that will allow for operation of a cycle that includes at least an adsorption step and a regeneration step. In the adsorption step, the impurity lean gas stream from the impurities removal unit is passed over one or more beds of adsorbent that are specific for certain types of impurities. The targeted impurities are adsorbed on to the one or more adsorbents in the one or more adsorbent beds. Once the adsorbents in the beds become loaded, the adsorbent bed must be regenerated in order to allow continued removal of the impurities from the impurity lean gas stream. The regeneration step actually involves two separate phases, the first regeneration phase being heating the adsorbent bed with a hot gas in order to allow the release of the impurities from the adsorbents followed by the second regeneration phase which is quickly cooling the adsorbent bed with cold gas in order to allow the adsorbents in the adsorbent bed to once again adsorb impurities (to enter into the adsorption step). Note that if the adsorbent bed is too hot, the impurities will not adsorb to the adsorbents. In addition, while the adsorbent beds of the present process will all run on a similar cycle, at least one of the adsorbent beds will be staggered in its cycle with regard to the other adsorbent bed(s) in order to allow continued uninterrupted functioning of the front end purification unit. As used herein, the term "staggered" with regard to the process carried out in the front end purification unit, typically refers to the fact that when one adsorbent bed is in the adsorption phase of the cycle, at least one of the other adsorption beds is in the regeneration phase of the cycle.

With regard to these various steps in the front end purification unit, the conditions under which they occur are known by those skilled in the art. More specially, typically the adsorption step is carried out by subjecting the gas stream to the adsorbents at a temperature from about −70° C. to about 50° C. thereby allowing the impurities for which the adsorbents are targeted to adsorb to the adsorbents. The first regeneration phase is typically carried out at a temperature from about 100° C. to about 275° C. while the second regeneration phase is typically carried out at a temperature from about −100° C. to about 50° C.

The cold box utilized in this process of the present invention can be any cold box unit that is known in the art. Those of ordinary skill in the art will recognize that any cold box that is capable of condensing carbon monoxide at a temperature that ranges from about −150° C. to about −250° C. can be utilized in the process of the present invention. Typically, such cold boxes will include condensation columns, heat exchangers, separator vessels, and distillation columns although other components may be included.

From a strictly structural standpoint, the one or more heat exchangers utilized in the present invention can also be any heat exchangers that are known in the art. More specifically, the heat exchangers will typically include at least a shell and a tube heat exchanger. The heat exchangers should be capable of operating at a temperature from about 100° C. to about 275° C. and be capable of being operated either in a constant flow mode (where the carbon monoxide lean gas stream is heated and passed through the one or more heat exchangers) or a standby mode (where a portion of the carbon monoxide lean gas stream is passed into the one or more heated exchangers where it is heated and then held within the one or more heat exchangers for a period of time until it is needed).

While the heat exchangers of the present invention may be structurally similar to what is known in the prior art, the critical aspect of the heat exchangers with regard to the process of the present invention is that the heat exchangers must be substantially fabricated of a material selected from the group consisting of chromium containing alloys and carbon steel. As used herein with regard to the present invention, the phrase "substantially fabricated of a material selected from the group consisting of chromium containing alloys and carbon steel" means that each and every component of the heat exchangers that comes into contact with the gas streams from the cold box must be made of an alloy that contains chromium as defined herein or of carbon steel as defined herein.

Furthermore, as used herein, the phrase "chromium containing alloys" refers to alloys that comprise chromium in an amount greater than about 5% by weight of the alloy composition with the remainder of the alloy composition primarily comprising either iron or nickel or mixtures thereof. In a preferred embodiment of the present invention the chromium containing alloy comprises chromium in an amount from about 10% by weight to about 35% by weight with the remainder of the alloy primarily being either iron or nickel or mixtures thereof. When the chromium containing alloy contains chromium, iron and nickel as the main components, preferably the chromium is present in the alloy in an amount from about 10% by weight to about 35% by weight, the iron is present in the alloy in an amount from about 60% by weight to about 90% by weight and the nickel is present in the alloy in an amount from about 5% by weight to about 15% by weight. In the preferred embodiments, the chromium containing alloy is a stainless steel such as 316 Stainless Steel.

Furthermore, as used herein, the phrase "carbon steel" refers to steel that contains from about 0.01% to about 2.0% carbon and trace amounts of manganese and silicon.

While there are a variety of pipes that connect the various components of the syngas impurities removal unit, the pipes that connect the one or more heat exchangers with the front end purification unit can also be critical to the process of the present invention as the syngas flowing through these pipes will in certain instances be subjected to the same conditions as when flowing through the one or more heat exchangers (high pressure and high temperature). Accordingly, in one embodiment of the present invention, the pipes connecting the one or more heat exchangers and the front end purification unit are also fabricated from either chromium containing alloys or carbon steel as defined hereinbefore. In one preferred embodiment, the same chromium containing alloys used to fabricate the one or more heat exchangers will also be used to fabricate the pipes connecting the one or more heat exchangers with the front end purification unit. Accordingly, as defined hereinbefore, with regard to the pipes, the chromium will be present in the chromium containing alloy in an amount greater than about 5% by weight with the remainder of the alloy primarily comprising either iron or nickel or mixtures thereof. In one alternative embodiment of the present invention, the chromium is present in an amount from about 10% by weight to about 35% by weight with the remainder of the alloy primarily being either iron or nickel or mixtures thereof. In the most preferred embodiments, when both the pipes and the heat exchangers are fabricated from a chromium containing alloy, the chromium containing alloy is stainless steel. In one alternative preferred embodiment, the same carbon steel used to fabricate the one or more heat exchangers will also be used to fabricate the pipes connecting the one or more heat exchangers with the front end purification unit.

In addition to the pipes that connect the one or more heat exchangers with the front end purification unit, the syngas treatment unit will also comprise a bypass pipe which allows for the transfer of the carbon monoxide lean gas stream from the cold box either directly to the front end purification unit where it will be used to regenerate the adsorbent beds or optionally this bypass pipe can be used to transfer the carbon monoxide lean gas stream for further use elsewhere in the process.

FIG. 1 provides an overview of the process of the present invention. With regard to this process, the first step involves providing a syngas treatment unit 1 as described hereinbefore. A syngas stream from a syngas producing unit 2 is introduced via line 3 into the impurities removal unit 4 of the syngas treatment unit 1. As noted above, the syngas stream introduced via line 3 will typically contain hydrogen and carbon monoxide as well as a variety of impurities such as methane, carbon dioxide, sulfur containing species, $NO_x$, unsaturated hydrocarbons and water. The syngas stream is introduced into the impurities removal unit 4 in an effort to remove a large portion of these impurities from the syngas stream thereby producing an impurity lean gas stream. The impurity lean gas stream will typically have the same general makeup as the syngas stream but with a reduced level of the impurities. The objective of this step in the process is to reduce the level of impurities from the syngas stream at this point in the process to minimize physical or safety issues that may present themselves downstream when gas streams that contain these types of impurities are injected into the cold box. As noted previously, those skilled in the art recognize that issues such as clogging and/or actual explosions may result due to the injection of gas streams that contain high levels of these impurities. With regard to this impurities removal unit step, preferably from about 80% to about 99% of the targeted impurities are removed.

In the next step of the process of the present invention, the impurity lean gas stream is withdrawn from the impurities removal unit 4 via line 5 and is then introduced into the front end purification unit 6 as described hereinbefore. The impurity lean gas stream is introduced during the adsorption step of the front end purification unit cycle. This step of the process is carried out in order to further reduce the impurities which present physical or safety issues downstream in the cold box 8 from the impurity lean syngas stream by using adsorbents in beds (not shown) that are selective for these impurities. Accordingly, the impurity lean gas stream is injected into the front end purification unit 6 under conditions that are known to those skilled in the art in order to promote the adsorption of the targeted impurities onto the one or more adsorbents contained in the one or more beds of the front end purification unit 6. As a result of passing the impurity lean gas stream over the one or more adsorbent beds, the targeted impurities within the impurity lean gas stream are adsorbed to the adsorbents thereby leaving the remaining portion of the impurity lean gas stream to form a purified syngas stream which will typically comprise at least hydrogen and carbon monoxide.

The purified syngas stream is then withdrawn from the front end purification unit 6 via line 7 and introduced into the cold box 8 as described hereinbefore. Once the purified syngas stream is introduced into the cold box 8, the carbon monoxide in the purified syngas stream is condensed at a temperature from about −180° C. to about −250° C. to form a pure carbon monoxide condensed stream which is removed via line 9 from the cold box 8 as carbon monoxide product. The remaining components form an overhead stream which contains mostly hydrogen with small amounts of carbon monoxide and possible trace impurities. This stream is referred to as the carbon monoxide lean gas stream. As used herein, the phrase "carbon monoxide lean gas stream" refers to a gas stream that has a carbon monoxide partial pressure of less than or equal to one bar. In other words, the amount of carbon monoxide in this carbon monoxide lean gas stream is equal to or less than one volume percent of the total carbon monoxide lean gas stream. In one preferred embodiment of the present invention, the carbon monoxide partial pressure is less than or equal to 0.5 bar, even more preferably less than or equal to 0.25 bar.

In the next step of the process, the resulting carbon monoxide lean gas stream is withdrawn from the cold box 8 via line 10 and is utilized in one of two manners. The first manner involves heating the carbon monoxide lean gas stream to be used to regenerate the adsorbent beds of the front end purification unit 6. Accordingly, in this option, the carbon monoxide lean gas stream is introduced into the one or more heat exchangers 11 that are in the constant flow mode in order to heat up the carbon monoxide lean gas stream. The heat exchangers 11 utilized in this step are fabricated of a material selected from the group consisting of chromium containing alloys or carbon steel as described hereinbefore. The material that the heat exchangers are fabricated from will depend upon the temperature to which the carbon monoxide lean gas stream is heated. More specifically, when the temperature that the carbon monoxide lean gas stream is heated to (within the range of the one or more heat exchangers of 100° C. to 275° C.) is greater than 175° C., the one or more heat exchangers are substantially fabricated of chromium containing alloys. In an alternative embodiment, when the temperature that the carbon monoxide lean gas stream is heated to is less than or equal to 175° C., the one or more heat exchangers can be substantially fabricated of either chromium containing alloys or carbon steel.

With regard to each of the above noted alternatives, the carbon monoxide lean gas stream is introduced from lines 10 and 12 into the one or more heat exchangers 11 fabricated of the noted material where the carbon monoxide lean gas stream is heated to the desired temperature as it passes through the one or more heat exchangers. The amount of gas flow through the one or more heat exchanges will be dependent upon the size of the cold box unit, but will typically be less than about 15% of the total amount of feed stream entering the cold box unit. In one alternative, the heated carbon monoxide lean gas stream flows through the one or more heat exchangers and is sent directly to the front end purification unit 6 via line 13 where it is used as the "hot gas" in the first phase of the regeneration step for the adsorbent beds. In another alternative, a portion of the heated carbon monoxide lean gas stream is retained in the one or more heat exchangers for a period of time until the gas stream is to be used.

When the heated carbon monoxide lean gas stream is passed to the front end purification unit, it heats the adsorbent beds, thereby allowing the impurities adsorbed to the adsorbents in the adsorbent beds to be released. As a result, the first phase of the regeneration step is completed. These released impurities form an adsorbent impurity stream which is passed on via line 14 for further treatment in a process unit 15 such as in a hydrogen pressure swing adsorption unit or to be used as a feed upstream.

Note that when the adsorbent bed of the front end purification unit 6 is in the first phase of the regeneration step of the front end purification unit cycle, the heat exchangers 11 will be in the constant flow mode as the need for hot gas is continuous. However, when the cycle goes to the second phase of the regeneration step of the front end purification unit cycle, there is no need for hot gas but is instead a need for a cooling gas. In this particular part of the cycle, the heat exchangers 11 are switched off line to the stand by mode, the portion of carbon monoxide lean gas that is in the one or more heat exchangers 11 is retained in the one or more heat exchangers unit, and the unheated carbon monoxide lean gas stream from the cold box 8 is instead rerouted through the bypass line 16 and line 13 to the front end purification unit 6 to be used as the cooling gas for this second phase of the regeneration step. In this instance as the need is for a cooling gas, the carbon monoxide lean gas stream is used directly from the cold box 8 without the necessity of heating as the cold state of the gas is beneficial to the rapid cooling of the adsorbent beds in the front end purification unit 6. While not depicted in the present FIGURE, in a still further embodiment of the present invention, the unheated carbon monoxide rich gas stream from the cold box 8 can instead be rerouted directly to the hydrogen pressure swing adsorption unit (15) for use. As the front end purification unit 6 contains two or more adsorbent beds, the flow of carbon monoxide lean gas from either the cold box 8 or the heat exchangers 11 is continuous as one of the adsorbent beds is typically always being regenerated when the syngas unit is running. As noted previously, in order to not experience down time with regard the syngas treatment unit, the cycles with regard to the beds are staggered. With regard to adsorbent beds that are in the regeneration step of the front end purification unit cycle, when the bed is in the first phase, the one or more heat exchangers are in the constant flow mode thereby supplying the necessary hot gas for the release of impurities from the adsorbent bed. However, when the bed is in the second phase, the one or more heat exchangers are in the stand by mode as there is no need for the hot gas at this point. At this point, the gas from the cold box bypasses the one or more heat exchangers and is injected directly into the front end purification unit to allow for cooling of the beds that are in the second phase of the regeneration step. Accordingly, with regard to the present process, at least one of the adsorbent beds is in the regeneration step of the cycle while at least one of the beds is in the adsorption step of the cycle.

The present invention further provides an additional process in which unwanted hydrocarbon and oxygenate products that interfere with downstream processes and are caused by FTS reactions in a syngas stream are decreased or eliminated. This process is applicable to syngas streams that contain at least hydrogen and carbon monoxide and have a carbon monoxide partial pressure less than or equal to one bar, and that are subjected to temperature conditions from about 100° C. to about 275° C. and pressure conditions from about 10 bar to about 60 bar. In this process, the equipment where the syngas is being subjected to these pressure and temperature conditions is replaced with equipment that is substantially fabricated from materials consisting of chromium containing alloys or carbon steel as defined hereinbefore. More specifically, in one alternative, when the temperature is greater than 175° C., the equipment is substantially fabricated of chromium containing alloys. In a second embodiment, when the temperature is less than or equal to 175° C., the equipment can be substantially fabricated from either chromium containing alloys or carbon steel, preferably carbon steel.

EXAMPLES

For carbon monoxide lean gas streams:
Experiments were carried out to study Fischer Tropsch Synthesis reaction kinetics in syngas treatment units by passing mixtures of hydrogen ($H_2$) and carbon monoxide (CO) in the form of carbon monoxide lean gas streams into tubes made of either chromium containing alloys or carbon steel at a high pressure of 26 bars and at different temperatures (150° C., 200° C. and 250° C.) to determine if exposure of these materials to the $H_2$/CO mixture resulted in FTS reactions on the inner surface of the tube to give unwanted hydrocarbon and oxygenate products. The tubes utilized had a one inch outer diameter and a sixteen and a half inch length (1" OD×16.5" L).

The examples noted below were carried out using either tubes made of carbon steel or tubes made of stainless steel (316 Stainless Steel). Each of the materials was tested by using a tube of the dimensions noted above fabricated of the noted material. Each tube was then subjected to a pressure of approximately 26 bar and a series of temperatures while the $H_2$/CO mixture was allowed to either flow through the tube (depicting the flow mode of the heat exchangers) or allowed to remain in the tube for a period of time (depicting the stand-by mode of the heat exchangers).

In the experiments carried out, the tubes were first subjected to a temperature of 250° C. and the gas sample was allowed to flow through at a rate to give a total contact time of approximately 2.9 seconds. During the flow mode of each of these examples, samples were analyzed for carbon content as the gas exited the tube. Once it was determined that the carbon content in the removed samples was stable, a final reading was taken and the tube was closed thereby encapsulating the gas mixture within the tube to depict the stand-by mode for the heat exchangers. This was accomplished by trapping the gas at high pressure and closing the valve upstream and downstream of the reactor for and leaving the gas in the tube for a total of 18 hours (64,800 seconds). A sample was analyzed downstream of the reactor after 18 hours. The temperature was then lowered to 200° C. and the process repeated. A total of three cycles were carried out for each tube in this manner: one at 250° C., one at 200° C. and one at 150° C.

The sequence of the testing for each tube was:

First cycle: 26 bar, 250° C. Flow Mode followed by Stand-by Mode

Second cycle: 26 bar, 200° C. Flow Mode followed by Stand-by Mode

Third cycle: 26 bar, 150° C. Flow Mode followed by Stand-by Mode

On average, depending on the total number of cycles and the flow mode/standby mode, each tube was tested for more than 300 hours and the results were reproduced using multiple numbers of tubes. During the flow mode, the gas was passed at a flow rate to allow approximately 2.9 seconds of contact time of the gas with the tube inner surface. The contact time was calculated based on volumetric flow rate to volume of the reactor ratio. The sample was continuously analyzed downstream using Gas Chromatography and FTIR analyzer to determine carbon content. FTS can produce wide range of products with very wide range of molecular weight or chain length. The products from Fischer Tropsch synthesis involve paraffins, olefins, alcohols, water and carbon dioxide ultimately leading to wax formation. It can also produce ketones, aldehydes, ethers as by products. Gas Chromatography with Flame Ionization detector was used to analyze tube outlet sample stream for paraffins (C1-C5), olefins (C2-C5) and alcohols (C1-C2). Fourier Transform Infrared (FTIR) was added to the gas exhaust line to measure carbon monoxide, carbon dioxide and water in order to conduct carbon balance. Fischer Tropsch product formation was converted to carbon content in product as shown below:

Carbon content in products (ppm)=concentration of Methane+2×concentration of Ethane+3×concentration of n-Propane+4×concentration of n-butane+5×concentration of n-pentane+2×concentration of Ethylene+3×concentration of 1-Propylene+4×concentration of 1-butene+5×concentration of 1-pentene+concentration of Methanol+2×concentration of Ethanol+ . . .

Note that FTS reactions follow the Arrhenius equation and increase exponentially with increase in temperature.

The table below provides the results obtained with regard to contacting carbon monoxide lean gas streams having a carbon monoxide partial pressure of 0.13 bar with either carbon steel tubes or 316 Stainless Steel tubes at a pressure of approximately 26 bar and at varying temperatures for the times noted.

TABLE 1

| | | | | Carbon content in product (ppm) | |
|---|---|---|---|---|---|
| Gas Composition | Temperature (° C.) | CO partial pressure (bar) | Contact time (seconds) | Carbon steel | 316 Stainless steel |
| 0.5% CO in $H_2$ | 150 | 0.13 | 2.9 | 2 | 0 |
| 0.5% CO in $H_2$ | 150 | 0.13 | 64800 | 210 | 0 |
| 0.5% CO in $H_2$ | 200 | 0.13 | 2.9 | 28 | 0 |
| 0.5% CO in $H_2$ | 200 | 0.13 | 64800 | 2014 | 55 |
| 0.5% CO in $H_2$ | 250 | 0.13 | 2.9 | 176 | 3 |
| 0.5% CO in $H_2$ | 250 | 0.13 | 64800 | 4420 | 386 |

As can be seen from this table, contact of the carbon monoxide lean gas stream with the stainless steel (chromium containing alloy) tubes resulted in no or very little FTS reactions (no or very low carbon content (ppm's) in product regardless of the temperature). However, very little FTS reactions were present in the carbon steel tubes only when the temperature was maintained below 200° C.

Elements of the Figures

1—syngas treatment unit
2—syngas producing unit
3—line for introducing syngas from the syngas producing unit into the impurities removal unit
4—impurities removal unit
5—line for introducing the impurity lean gas stream from the impurities removal unit into the front end purification unit
6—front end purification unit
7—line for introducing the purified syngas stream from the front end purification unit into the cold box
8—cold box
9—line for removing pure carbon monoxide product from the cold box
10—line for introducing carbon monoxide lean gas stream from the cold box to one of two options
11—one or more heat exchangers
12—line introducing carbon monoxide lean gas stream from line 10 into the one or more heat exchangers
13—line for introducing heated carbon monoxide lean gas stream from the one or more heat exchangers into the front end purification unit 14—line for introducing adsorbent impurity stream from the front end purification unit to the process unit
15—process unit
16—bypass line

What is claimed is:

1. A process for decreasing or eliminating unwanted hydrocarbon and oxygenate products caused by Fisher Tropsch Synthesis reactions in a gas stream having a carbon monoxide partial pressure of less than or equal to one bar and produced in a syngas treatment unit, said process comprising the steps of:
   A. providing a syngas treatment unit that comprises
      a) an impurities removal unit selected from an adsorption removal unit and an absorption removal unit;
      b) a front end purification unit containing one or more beds of adsorbents selective for the removal of impurities, the front end purification unit operating on a cycle that includes at least an adsorption step and a regeneration step;
      c) a cold box allowing for the condensation of CO at a temperature range from about −150° C. to about −250° C.;
      d) one or more heat exchangers operating at a temperature from about 100° C. to 275° C. and capable of being operated in a constant flow mode or a standby mode;
      e) pipes that connect the one or more heat exchangers and the front end purification unit; and
      f) a bypass pipe which allows for the transfer of a cooling stream from the cold box either directly to the front end purification unit or optionally for further use;
   B. introducing a syngas stream containing hydrogen, carbon monoxide, methane and a variety of impurities into the impurities removal unit in order to remove a large portion of the impurities which present physical or safety issues downstream in the cold box from the syngas stream thereby producing an impurity lean syngas stream;
   C. withdrawing the impurity lean syngas stream from the impurities removal unit and introducing the impurity lean syngas stream into the front end purification unit during the adsorption step of the front end purification unit cycle in order to further remove impurities which present physical or safety issues downstream in the cold box from the impurity lean syngas stream by adsorbing the impurities on to the one or more adsorbents contained in the beds of the front end purification unit thereby producing a purified syngas stream;
   D. withdrawing the purified syngas stream from the front end purification unit and introducing the purified syngas stream into the cold box wherein the carbon monoxide in the purified syngas stream is condensed at a temperature from about −180° C. to about −250° C. to form a pure carbon monoxide stream and the remaining components of the purified syngas stream form a carbon monoxide lean gas stream;
   E. removing the pure carbon monoxide stream from the cold box as carbon monoxide product; and
   F. withdrawing the carbon monoxide lean gas stream from the cold box and either:
      i. introducing the carbon monoxide lean gas stream into the one or more heat exchangers that are in the constant flow mode during the regeneration step of the front end purification unit cycle in order to heat the carbon monoxide lean gas stream to a temperature from about 100° C. to about 275° C. and then recycling the heated carbon monoxide lean gas stream to the front end purification unit to be used for the regeneration of the adsorbents in the beds of the front end purification unit thereby producing an adsorbent impurity stream that is passed on for further treatment or as a feed upstream in the process, the one or more heat exchangers being substantially fabricated of a material selected from the group consisting of chromium containing alloys and carbon steel, with the proviso that when the temperature that the carbon monoxide lean gas stream is heated to is greater than 175° C., the one or more heat exchangers are substantially fabricated of chromium containing alloys,
      ii. bypassing the one or more heat exchangers by passing the carbon monoxide lean gas stream through the bypass line and introducing the unheated carbon monoxide lean gas stream into the front end purification unit to be used to cool down the regenerated adsorbent beds prior to the front end purification unit cycle being switched to the adsorption cycle while retaining a portion of carbon monoxide lean gas in the one or more heat exchangers that are in the standby mode.

2. The process of claim 1, wherein when the one or more heat exchangers are substantially fabricated from chromium containing alloys, the chromium containing alloys comprise chromium in an amount greater than about 5% by weight with the remainder of the alloy comprising iron, nickel or mixtures thereof.

3. The process of claim 2, wherein the chromium is present in an amount from about 10% by weight to about 35% by weight with the remainder of the chromium containing alloy being iron, nickel or mixtures thereof.

4. The process of claim 3, wherein the chromium containing alloy is stainless steel.

5. The process of claim 1, wherein when the one or more heat exchangers are substantially fabricated from chromium containing alloys, the pipes connecting the one or more heat exchangers and the front end purification unit are also fabricated from chromium containing alloys.

6. The process of claim 5, wherein the chromium containing alloys used to substantially fabricate the one or more heat exchangers and the pipes connecting the one or more heat exchangers to the front end purification unit, the chromium containing alloys comprise chromium in an amount greater than about 5% by weight with the remainder of the alloy comprising iron, nickel or mixtures thereof.

7. The process of claim 6, wherein the chromium is present in an amount from about 10% by weight to about 35% by weight with the remainder of the alloy being iron, nickel or mixtures thereof.

8. The process of claim 7, wherein the chromium alloy is stainless steel.

9. The process of claim 1, wherein the carbon monoxide lean gas stream is heated to a temperature that is less than 175° C. and the one or more heat exchangers are substantially fabricated of carbon steel.

10. The process of claim 9, wherein the pipes connecting the one or more heat exchangers to the front end purification unit are also fabricated of carbon steel.

11. The process of claim 1, wherein the syngas treated is produced using a coal gasification unit, a steam hydrocarbon reforming unit, an autothermal reforming unit or a partial oxidation unit.

12. The process of claim 1, wherein the impurities removal unit is an absorption removal unit selected from a physical solvent removal unit and a chemical solvent removal unit.

13. The process of claim 1, wherein the one or more adsorbents utilized in the front end purification unit are selected from alumina, zeolites, silica gels and mixtures thereof.

14. The process of claim 13, wherein the one or more adsorbents utilized in the front end purification unit are independently selected from zeolites in the form of molecular sieves selected from A type, Y type and X type molecular sieves.

15. The process of claim 13, wherein the one or more adsorbents utilized in the front end purification unit are present in one or more beds within the front end purification unit.

16. The process of claim 13, wherein when more than one adsorbent is utilized in the adsorbent beds, the adsorbents are present in layers within each adsorbent bed.

17. The process of claim 1, wherein the carbon monoxide lean gas stream introduced into the one or more heat exchangers is heated to a temperature greater than 175° C., and the one or more heat exchangers are substantially fabricated of chromium containing alloys.

18. The process of claim 1, wherein the carbon monoxide lean gas stream is heated to a temperature less than or equal to 175° C., and the one or more heat exchangers are substantially fabricated of either chromium containing alloys or carbon steel.

19. The process of claim 18, wherein the one or more heat exchangers are substantially fabricated of carbon steel.

20. The process of claim 18, wherein the one or more heat exchangers are substantially fabricated of chromium containing alloys.

21. A process for decreasing unwanted hydrocarbon and oxygenate products that interfere with downstream processes and are caused by Fisher Tropsch Synthesis reactions in a syngas stream containing at least hydrogen and carbon monoxide and having a carbon monoxide partial pressure of less than or equal to one bar, when the syngas is subjected to a temperature conditions from about 100° C. to about 275° C. and pressure conditions from about 10 bar to about 60 bar, the process comprising replacing the equipment where the syngas is being subjected to these pressure and temperature conditions with equipment that is substantially fabricated from materials consisting of chromium containing alloys and carbon steel with the proviso that when the temperature is greater than 175° C., the equipment is substantially fabricated of chromium containing alloys.

22. The process of claim 21, wherein when the equipment is substantially fabricated from chromium containing alloys, the chromium containing alloys comprise chromium in an amount greater than about 5% by weight with the remainder of the alloy comprising iron, nickel or mixtures thereof.

23. The process of claim 22, wherein the chromium is present in an amount from about 10% by weight to about 35% by weight with the remainder of the alloy being iron, nickel or mixtures thereof.

24. The process of claim 23, wherein the chromium alloy is stainless steel.

25. The process of claim 21, wherein the equipment is substantially fabricated from carbon steel.

\* \* \* \* \*